United States Patent [19]

Zaoralek et al.

[11] Patent Number: 5,072,497

[45] Date of Patent: Dec. 17, 1991

[54] GLAZING OR CALENDERING ROLL

[75] Inventors: Heinz-Michael Zaoralek; Erich Vomhoff, both of Königsbronn, Fed. Rep. of Germany

[73] Assignee: Schwabische Huttenwerke GmbH, Aalen-Wasseralfingen, Fed. Rep. of Germany

[21] Appl. No.: 515,818

[22] Filed: Apr. 27, 1990

[30] Foreign Application Priority Data

Jan. 29, 1990 [DE] Fed. Rep. of Germany ... 9000980[U]

[51] Int. Cl.⁵ .............................................. B21B 31/08
[52] U.S. Cl. .......................................... 29/123; 29/129
[58] Field of Search .......................... 29/123, 129, 118; 165/88, 89, 90, 91

[56] References Cited

U.S. PATENT DOCUMENTS

| 4,050,510 | 9/1977 | Theysohn | 165/89 |
| 4,074,750 | 2/1978 | Beghin | 165/89 |
| 4,683,627 | 8/1987 | Reinhold | 29/123 X |

Primary Examiner—Timothy V. Eley
Assistant Examiner—C. Richard Martin
Attorney, Agent, or Firm—Armstrong, Nikaido, Marmelstein, Kubovcik, & Murray

[57] ABSTRACT

A glazing or calendering roll includes a roll body having a flange journal at each end of the roll body and peripheral passages formed near the roll surface in the roll body for conducting a fluid heat or cold carrier through the roll. The roll has a central bore with large diameter. In the central bore, a displacement body is arranged in such a manner that between the inner wall of the central bore and the outer wall of the displacement body an annular gap is formed for conducting the fluid heat or cold carrier therethrough.

4 Claims, 4 Drawing Sheets

GLAZING OR CALENDERING ROLL

BACKGROUND OF THE INVENTION

1. Field of the Invention

The invention relates to a glazing or calendering roll comprising a roll body having a flange journal at each end of the roll body and peripheral passages formed near the roll surface in the roll body for conducting a fluid heat or cold carrier through the roll body.

2. Description of the Prior Art

In heated rolls as used for example in paper machines for glazing the paper web essentially two types of construction have established themselves:

1. tubular rolls with shrunk-in displacement bodies and
2. peripherally drilled rolls.

In the first type a liquid heat carrier flows through an annular gap between the roll tube and the displacement body. In the second type the heat carrier flows through a plurality of bores just beneath the roll surface.

More recent developments in the manufacture of paper machines towards higher surface temperatures and line pressures favour the peripherally drilled roll for various reasons:

At high line pressures large diameters must be chosen to prevent sagging of the rolls and flexural stresses. Larger diameters, which have become increasingly more significant in recent times, lead in tube rolls to an increase of the wall thickness and thus to a further distance of the heat from the heat carrier to the roll surface. Due to the relatively small distance of the peripheral bores from the roll surface which is practically not dependent on the roll diameter, the peripherally drilled roll has the advantage that the path of the heat from the heat carrier through the roll wall to the roll surface is short and thus an effective heat transfer is guaranteed.

With high line pressures larger diameters must be chosen to limit the bowing or deflection of the rolls and the flexural stresses. Excessive deflection or bowing and excessive alternating flexural stresses can only be avoided by increasing the resistance moment of the roll cross-section, which is proportional to the fourth power of the diameter.

This therefore means that larger roll diameters involve a decisive increase in the wall thickness and a pronouced increase in the weight of the roll. This also leads to an increase of the volume of heat carrier fluid which has to be heated on every heating up of the roll or cooled in every cooling operation.

It is therefore obvious, and has already been suggested, to seal the widened inner bore at the ends of the roll body from the heat carrier fluid. However, such a measure also involves disadvantages:

Depending on the connection of the peripheral bores, in driven rolls the fluid carrier must be returned in the roll interior to the inlet journal. For a corresponding tube which is led through the interior of the roll a complicated support structure is required.

The possibility of leakage under temperature-induced thermal stresses in the sealing elements cannot be excluded. Should heat carrier fluid penetrate the roll interior, the result could be a considerable interruption in operation.

In particular during the heating up, the avoidance of contact of the inner roll wall with the hot heat carrier leads to additional tensile stresses at this point, which add to the already present residual inherent stresses originating from the casting of the roll body. The explanation of this is that the outer region of the roll jacket with the peripheral bores heats up fast and expands correspondingly quicker than the inner region.

In rolls of large diameter with correspondingly enlarged inner bores a large amount of heat carrier fluid is necessary in operation. This is not only expensive but as already mentioned the fluid carrier must also be heated up or cooled down every time there is a change of mode of the glazing assembly or calender into which the roll is incorporated. This is not only a waste of energy but additionally causes a lengthening of the heating and cooling operations and accordingly a shortening of the operating time available.

Enlarging the inner bore in rolls of large diameter by drilling also changes the inherent stress distribution of the hard cast rolls in such a manner that the inherent tensile stress increases in the bore wall. Admittedly, this is certainly desirable for high performance heating operations because the superimposed thermal stress counteracts the distribution of the inherent or internal stress and on superimposition of the two stress actions the stress level is diminished. However, in the heating-up phase the temperature increase of the outer roll jacket due to the hot heat carrier in the peripheral bores only follows the temperature increase of the inner roll jacket with a certain delay. This applies in the same manner to the expansion of the roll material at the points. Due to the more rapidly expanding roll material of the shell, the roll bore is subjected to additional tensile stress. In the knowledge of these relationships the admissible heating-up rates are therefore greatly restricted, for example to 0.5° C./min. This means a considerable increase of the waiting times until there is operational readiness; for example, the heating-up time for an operating temperature of 250° C. starting from 20° C. room temperature is almost eight hours.

When a paper web tears and a paper web to be treated is then again led onto the roll, the thermal stresses change in a very short time. With the low admissible temperature change rates it is practically impossible to react to these changes with corresponding heating. The consequences are undesirable quality and thickness fluctuations in the paper web.

Finally, a further disadvantage results from the regulations for approval of various countries. There are countries in which containers with internal pressure fall under certain of the frequently very restrictive regulations governing pressure containers, although as regards the wall thickness they are overdimensioned to such an extent that in other countries they are considered to be machine components. In hard or chilled cast rolls, if the approval regulations are narrowly interpreted, this could lead to considerable problems in obtaining approval because the material "chilled cast iron" is not standardized in the corresponding regulation. Due to the pump pressure for transporting the heat carrier fluid and due to its own vapour pressure even when using heat carrier oils, pressures occur in the interior of the rolls which lie considerably above the ambient pressure.

SUMMARY OF THE INVENTION

The present invention therefore has as its object the elimination of the problems of the prior art referred to above; in particular, a roll is to be proposed which even with large roll diameters requires only a small amount of heat carrier fluid and does not need any complex heat carrier return and in which it is further possible to largely avoid stresses in the roll body during the heating-up phase, thus making possible substantially shorter heating-up times and adjustment times.

This problem is solved in a glazing or calendering roll comprising a roll body having a flange journal at each end of the roll body and peripheral passages formed near the roll surface in the roll body for conducting a fluid heat or cold carrier through the roll body by the improvement in which the roll has a central bore widened in its diameter as compared with the peripheral passages and in the central bore a displacement body is arranged in such a manner that between the inner wall of the central bore and the outer wall of the displacement body an annular gap for conducting the fluid heat or cold carrier is formed.

Further features for obtaining advantageous and expedient embodiments are defined by the features of the subsidiary claims. If such a roll is provided with a central bore with large diameter in which a displacement body is mounted so that a circular annular gap is formed between the inner side of the bore and the displacement body through which a liquid heat or cold carrier medium can be conducted once more through the roll along its longitudinal axis, preferably back in the direction towards the journal through which the heat or cold carrier medium was introduced into the roll, then this represents an elegant solution for the return of the heat carrier necessary in drive rollers. In addition, the necessary amount of heat carrier liquid is greatly reduced. Finally, in particular during the heating-up of the roll it is ensured that the roll is uniformly heated both on the outside by the peripheral passages and on the inside by the central bore. As a result there is no danger of an excessive increase of the internal tensile stresses. Consequently, the heating-up process for the roll can be considerably expedited and the shut-down time necessary for roll changes or maintenance work can be reduced. Furthermore, the necessary regulating time in the event of temperature fluctuations at the roll body can be very favourably influenced, namely shortened. To make the heat transfer from the heat carrier medium to the roll surface more effective it may be advantageous to select the diameter of the displacement body so that the central bore in the tube-shaped roll body is completely filled, the liquid heat or cold carrier being conducted through the roll in the peripheral passages near the roll surface.

If the heat or cold carrier after having been passed through the peripheral passages once is conducted back through the annular gap, for which purpose a connecting conduit is provided between the peripheral passages and the annular gap, not only the problem of the heat carrier supply through the inlet journal is advantageously solved but furthermore an additional leveling off of the temperature profile across the roll body in the axial direction is obtained.

The aforementioned advantages can be still further optimized if the respective three adjacent peripheral passages are connected to each other and to the annular gap in such a manner that the heat or cold carrier first flows through the roll via a first passage in one direction, thereafter flows back in an adjacent passage and finally flows through the roll once again in a third passage before it flows back through the annular gap, the necessary connections being provided between the passages and the annular gap.

The heat or cold carrier may be conducted in any desired order through the peripheral passages before it is discharged through the annular gap between the roll tube and the displacement body preferably in the direction towards the inlet journal. In spite of this great variety of possibilities for conducting the carrier liquid through the roll body, the danger of a leakage towards the interior is very small because the displacement body is a steel tube seal-welded.

If the displacement body fills the inner diameter of the enlarged central bore completely and further axial passages of small diameter are provided in the vicinity thereof in which the heat or cold carrier as a rule is returned to the inlet journal through which the carrier entered the roll body, for which purpose connections are provided between the peripheral passages and the further axial passages, the necessary amount of heat carrier liquid is then restricted to the relatively small volume of the peripheral passages, the further axial passages and the connections. In addition, in the heating-up phase the outer and inner regions of the tube-shaped roll body are heated up simultaneously by means of the hot heat carrier in the peripheral passages or bores and the return passages or bores, thereby avoiding additional thermal stress due to momentarily occurring temperature differences. Calculations have shown that it is possible to increase the heating-up rate to 4° C./min. With the aforementioned basic values the heating-up time for the roll is reduced to just below 1 hour. When the paper web tears and is subsequently led onto the roll again, it is easier to subsequently regulate the rapidly changing requirements to the heating power and thus increase the uniformity of the production and guarantee uniform paper quality. Since the heat and cold carrier liquid need only be passed through the passages, the roll body need not be designed as pressure container and this makes it possible to overcome the aforementioned problems in getting approval without using special constructions. The sole use of bores or passages of small diameter may be based on calculation methods for tubes which very greatly simplifies the design and possibly the approval of the heated peripherally drilled rolls.

While heat is removed from the surface of the heating roll the heat carrier liquid cools down during the repeated passage through the peripheral passages or bores. When the heat carrier liquid is returned through the further axial passages or bores, it is again slightly heated because the average temperature of the roll is somewhat higher than that of the returned heat carrier liquid. The returned heat carrier liquid then withdraws some of the transferred heat again from the interior of the roll and thus reduces the internal temperature of the roll slightly. This also diminishes the thermal compressive stress in the roll interior and ensures at the same time that the peak of the thermal tensile stress in the outer shell of the roll jacket is reduced, which is to be regarded as a particular advantage of this construction. This has a positive influence on the operational reliability of the roll.

The roll interior can also be completely sealed by sealing discs instead of the displacement body. This substantially reduces any likelihood of leakage. In addition, the expenditure in producing the heating roll is reduced because the shrinking-in of the displacement body is no longer necessary.

If the heat or cold carrier medium after one or three passages through one or more peripheral passages is returned through one or more of the further axial passages to the journal, for which purpose corresponding connections are provided, then in particular in this embodiment (although also in the other embodiments) during the heating-up phase of the roll the outer and inner regions of the tube-shaped roll body are brought still more uniformly to the desired temperature.

The aforementioned advantages of the present invention are also readily achieved when the flow direction of the heat carrier medium is exactly the converse or is modified in any other manner.

BRIEF DESCRIPTION OF THE DRAWINGS

Hereinafter the invention will be explained with the help of preferred embodiments with reference to the accompanying drawings, thus illustrating further features and advantages of the present invention. In the drawings.

DESCRIPTION OF THE PREFERRED EMBODIMENTS

Figure 1:
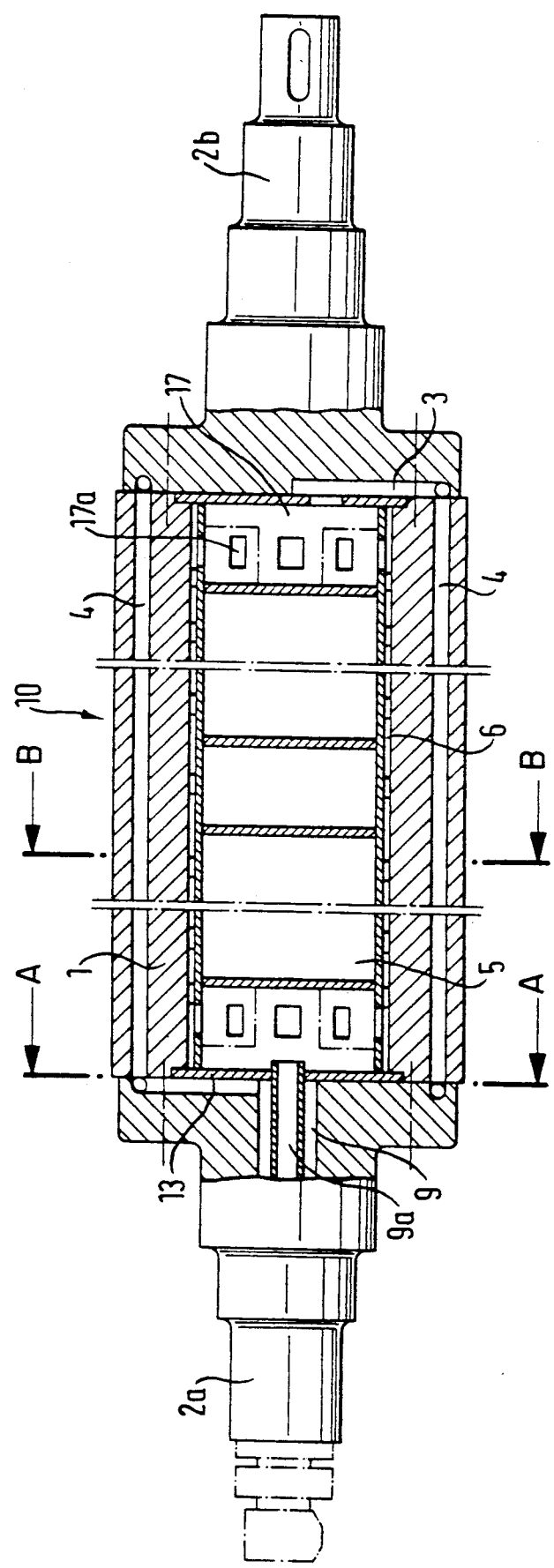
FIG. 1 shows in a longitudinally sectioned representation along the line c—c of FIG. 3 an embodiment of a roll comprising a displacement body which does not completely fill the widened central bore.

The roll shown in FIG. 1 and denoted generally by the reference numeral 10 comprises a roll body 1 and a displacement body 5 which does not completely fill the widened central bore within the roll body 1. As a result, a substantially circular annular gap 6 is left between the inner side of the bore and the displacement body 5. The displacement body 5 can be secured via additional head plates 13 to the roll body by means of screws, bolts or the like. It is also conceivable to connect the displacement body 5 for example to the roll body 1 by welding. The roll body 1 is provided at each end with a screwed-on journal 2a, 2b. The journal 2a is configured so that it is possible to introduce therethrough heat carrier liquid into the roll 10 and withdraw used or cooled heat carrier liquid. For this purpose a supply conduit 9 is axially provided in the inlet journal 2a together with a likewise axially disposed discharge conduit 9a. These conduits, like all the other conduits, can of course also be traversed by the carrier liquid in the opposite direction. The journal 2b is designed for driving the roll 10. At both journals 2a, 2b the roll 10 is movably mounted in journal bearings, not illustrated here. Near the surface of the roll body 1 peripheral passages or bores 4 are provided. These are connected via connection conduits 3, 17, 17a to the annular gap 6.

If warmed heat carrier fluid is introduced through the journal 2a into the roll body 1, it is conducted via connection conduits 3 into the peripheral passage 4. At the end of each peripheral passage 4 either a connection passage 4a is provided to an adjacent peripheral passage or connections 3, 17, 17a are provided to the annular gap 6. If connection conduits are provided to the annular gap 6, the slightly cooled heat carrier liquid flows through the connections and through the annular gap 6 back to the journal 2a again. The heat carrier liquid is again discharged from the roll body 1 through the journal 2a. For the transfer of the heat carrier liquid from the peripheral passages or bores 4 to the annular gap 6, annular spaces 17 with corresponding passages 17a may also be used as illustrated in the present embodiment.

Figure 2:
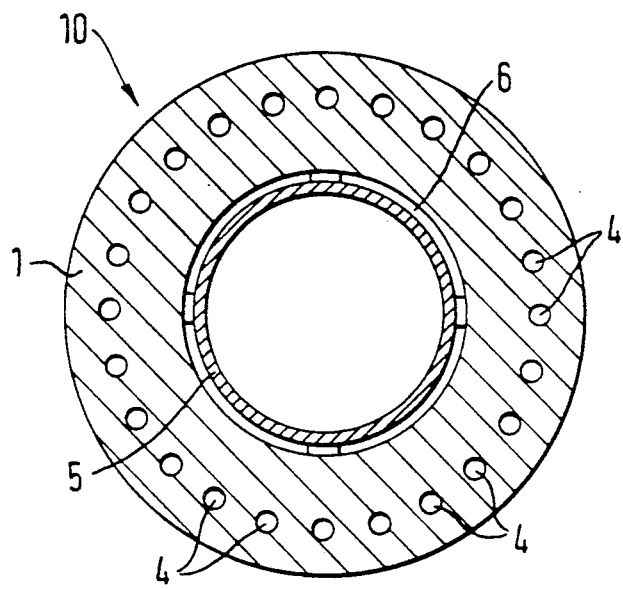
FIG. 2 shows a cross-section through the roll according to FIG. 1 along the sectional plane B—B.

FIG. 2 shows the roll body 1 of the roll 10 in cross-section, indicating the position of the peripheral bores 4 in the vicinity of the roll surface. The sealed displacement body 5 is dimensioned in its diameter with respect to the roll body 1 in such a manner that the annular gap 6 results.

Figure 3:
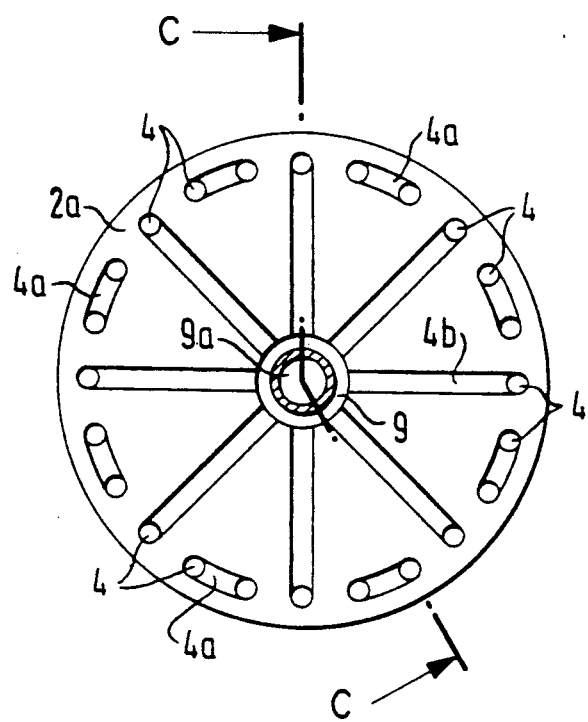
FIG. 3 shows a cross-sectional illustration of the roll according to FIG. 1 along the sectional plane A—A of the line D—D of FIG. 6.

FIG. 3 shows schematically a lateral elevation of the journal 2a. The connections 4b of the peripheral passages or bores 4 to the supply conduit 9 of the journal 2a can clearly be seen. At the other end (at the end of the journal 2b) of the roll 10 the peripheral passages 4 connected to the supply conduit 9 are connected to adjacent peripheral passages 4. At the illustrated end of the roll 10 circumferentially extending connections 4a between two adjacent peripheral passages 4 can be seen. The last of the peripheral passages 4 joined here in respective groups of three is connected via a connection 3, 17, 17a to the annular gap 6. In this manner the heat carrier liquid can be conducted several times axially through the roll body 1 of the roll 10 before it leaves the roll 10 again through the discharge conduit 9a.

Figure 4:
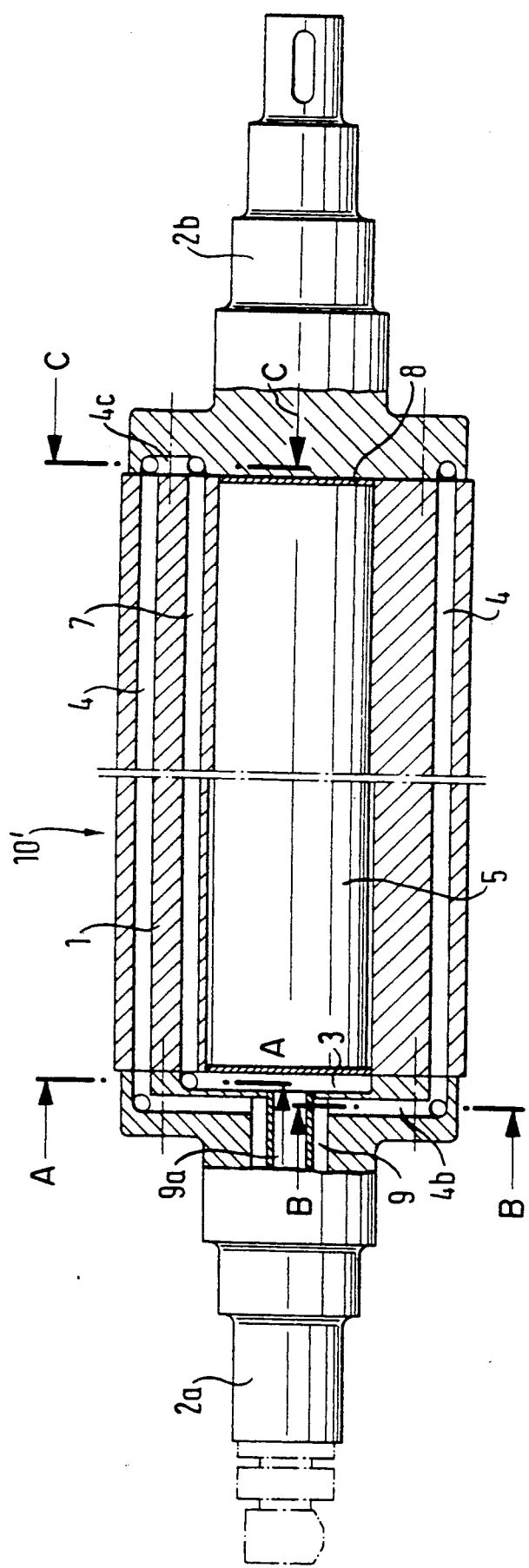
FIG. 4 shows in a longitudinally sectioned representation along the line D—D of FIG. 6 an embodiment of a roll in which a displacement body completely fills the widened central bore.

In FIG. 4 an embodiment of the roll according to the invention can be seen which is denoted generally be the reference numeral 10'.

The roll 10' is provided with a widened central bore which is completely filled with a displacement body 5. The roll body 1 of the roll 10' is provided with peripheral passages or bores 4 near the roll surface. The peripheral passages 4 are connected via connections 4c to further axial passages or bores 7. The further axial bores 7 are in turn connected via an axial space 3 to the journal 2a through which the heat carrier medium is introduced into the roll body 1 and removed therefrom.

In the drawing of FIG. 4 it is indicated that instead of a displacement body 5 the widened central bore can also quite simply be welded closed, for example with closure covers 8, permitting simplified manufacture of the roll 10'.

The heat carrier liquid is introduced into the roll body 1 via the inlet journal 2a. There, the heat carrier liquid is supplied via connections 4b to the peripheral passages 4. Via connections 4a to adjacent peripheral passages 4 or via a connection 4c to the further axial passages 7 the heat carrier liquid is subsequently passed several times through the roll body 1 either near the roll surface or near the surface of the widened central bore. The cooled or used heat carrier liquid is discharged from the roll 10' via the inlet journal 2a in order to be brought outside the roll again to the desired temperature.

Figure 5:
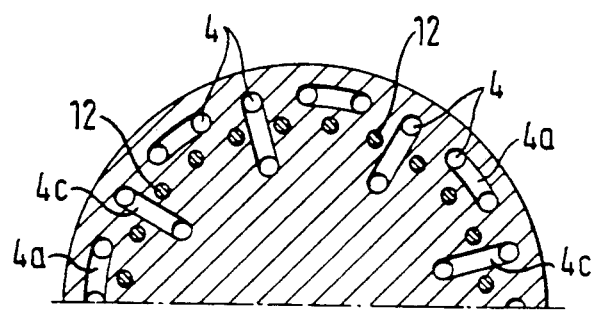
FIG. 5 is a partial cross-section for the roll of FIG. 4 along the sectional plane C—C (see FIG. 3)

The partial cross-section C—C of FIG. 5, the plane of which is located at the roll end at which the drive journal 2b is provided, again illustrates the connection geometry of the peripheral passages 4 and the further axial bores 7 to each other. The reference numeral 12 denotes securing means, for example screws, bolts or the like, with which the displacement body 5 is connected to the roll body 1 of the roll 10'. The connection conduits 4b permit a liquid exchange between adjacent peripheral passages 4. The radially extending connection conduits 4c ensure the return of the heat carrier liquid from the peripheral passages 4 to the further axial passages 7.

In the embodiment illustrated in FIG. 5 the heat carrier liquid is passed through three peripheral passages 4 near the roll surface and then returned to the inlet journal 2a through one of the axial passages 7 near the surface of the widened central bore.

Figure 6:
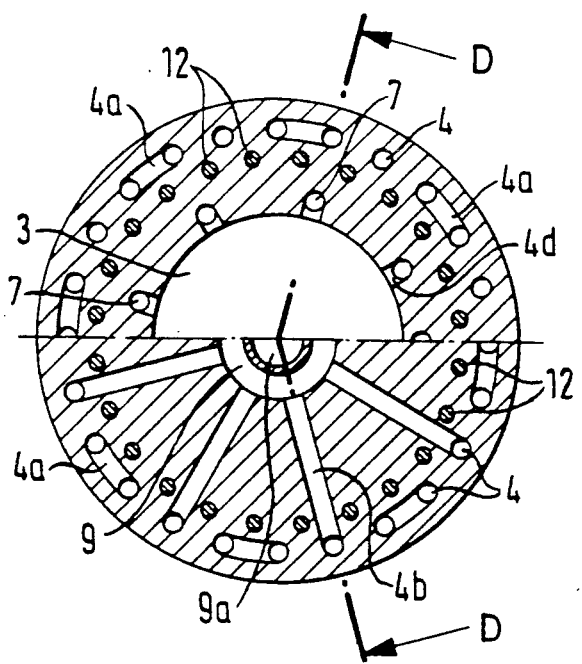
FIG. 6 is a cross-sectional representation in two sectional planes (A—A, B—B) for the roll according to FIG. 4.

The cross-section through the roll body of FIG. 4 shown in FIG. 6 illustrates two sectional planes. The sections are located at the end of the roll 10' at which the inlet journal 2a is disposed. The section A—A shows essentially the same features as apparent from the section C—C of FIG. 5. However, in this case instead of the radially extending connection conduits 4c likewise radially extending connection conduits 4d are provided which connect the further axial passages or bores 7 to the annular space from whence the cooled or used heat carrier liquid is returned again to the inlet journal 2a. The annular space 3 is connected here to the return conduit 9a.

The lower section B—B of FIG. 6 shows the connection of each third peripheral passage 4 to the heat carrier supply conduit 9 via connection conduits 4b. The peripheral bores 4 are connected to each other via connection conduits 4a.

The combination of FIGS. 5 and 6 represents the through-flow scheme for the carrier liquid through the peripheral passages or bores 4 and the further axial bores 7 and through the entire roll 10' as follows:

After entering the roll body via the inlet journal 2a or the supply conduit 9 extending therethrough (FIG. 4), the heat carrier liquid is introduced via the connection conduits 4b into every third peripheral passage 4 (FIG. 6). The heat carrier liquid is now conducted in axial direction through the peripherally extending passages 4 for transfer at the roll end of the drive journal 2b (FIG. 5) via connection conduits 4a to adjacent peripheral passages 4. The heat carrier liquid is again conducted through the adjacent peripheral passage 4 axially through the roll body 1. At the roll end of the inlet journal 2a the heat carrier liquid is transferred once more via a circumferentially extending connection conduit 4a to an adjacent peripheral bore. After an additional axial passage through a further adjacent peripheral bore 4, the heat carrier liquid is further conducted via radially extending connection conduits 4c to the further axial bores 7 (FIG. 4, FIG. 5). After the heat carrier liquid has passed through the further axial bores 7 it is conveyed via the radially inwardly extending connection conduits 4d to the annular space 3. From the annular space 3 the cooled or used heat carrier liquid is conducted via the discharge conduit 9a through the inlet journal 2a out of the roll 10'.

We claim:

1. A glazing or calendering roll comprising:
   a roll body having ends and a central portion, said roll body having
      a flange journal at each end of the roll body,
      peripheral passages, extending in an axial direction between said ends of the roll body, formed near a roll surface in the roll body for conducting a fluid heat or cold carrier through a peripheral region of the roll body,
      a central bore in the roll body wider in diameter than a diameter of the peripheral passages,
      a displacement body arranged in the central bore, and
      an annual gap extending axially through the central portion of the roll body, said annular gap formed between an inner wall of the central bore and outer wall of the displacement body, for conducting the fluid heat or cold carrier through said central portion of said roll body.

2. A roll according to claim 1, wherein between the annular gap and the peripheral passages at least one connection is formed for passage of the fluid heat or cold carrier.

3. A roll according to claim 1, wherein three adjacent peripheral passages are connected together at ends thereof, a first passage extends in a direction towards a drive flange journal, an adjacent second passage follows in a direction towards the flange journal for entrance of the fluid heat or cold carrier, a third passage extends in the direction of the first passage and is connected to the annular gap and wherein connections are formed between the passages with respect to each other and between the passages and the annular gap.

4. A roll according to claim 1, wherein a plurality of the peripheral passages are connected to each other at ends thereof, and wherein one of the passages is connected to the annular gap between the roll body and the displacement body via at least one connection conduit.

* * * * *